United States Patent
Sun et al.

(10) Patent No.: US 7,342,253 B2
(45) Date of Patent: Mar. 11, 2008

(54) DISPLAY PANELS WITH ANTI-NEWTON RING STRUCTURES

(75) Inventors: Jia-Hung Sun, Fenshan (TW); Yaw-Ming Tsai, Taichung Hsien (TW); Shih-Chang Chang, Hsinchu (TW); Kuang-Cheng Lee, Hualien (TW)

(73) Assignee: TPO Display Corp., Miao-Li County (TW)

( * ) Notice: Subject to any disclaimer, the term of this patent is extended or adjusted under 35 U.S.C. 154(b) by 325 days.

(21) Appl. No.: 10/992,008

(22) Filed: Nov. 19, 2004

(65) Prior Publication Data

US 2006/0108586 A1    May 25, 2006

(51) Int. Cl.
*H01L 29/04* (2006.01)
(52) U.S. Cl. .......................... 257/72; 257/59
(58) Field of Classification Search ............... 257/72, 257/59
See application file for complete search history.

(56) References Cited

U.S. PATENT DOCUMENTS 7,133,104 B2 * 11/2006 Kim et al. ................. 349/147

FOREIGN PATENT DOCUMENTS

| CN | 1357782 | 7/2002 |
|---|---|---|
| JP | 2-29622 | 1/1990 |
| JP | 3-191329 | 8/1991 |

* cited by examiner

*Primary Examiner*—Douglas M. Menz
(74) *Attorney, Agent, or Firm*—MH2 Technology Law Group LLP

(57) ABSTRACT

A display panel with an anti-Newton ring structure is disclosed. The display panel includes a substrate with an array region and a display region defined thereon. A buffer layer is disposed on the substrate and at least one transistor is formed in the array region. The display panel further includes an anti-Newton ring structure substantially composed of a silicon layer on the buffer layer in the display region, at least one dielectric layer disposed on the anti-Newton ring structure, and a pixel electrode disposed on the dielectric layer in the display region.

18 Claims, 4 Drawing Sheets

DISPLAY PANELS WITH ANTI-NEWTON RING STRUCTURES

BACKGROUND

The present invention relates to display panels, and more particularly, to liquid crystal display (LCD) panels with anti-Newton ring structures.

As manufacturing costs decrease and quality improves, liquid crystal displays are increasingly employed in different products such as notebook computers, personal digital assistants (PDAs), mobile phones, clocks, and the like. Since liquid crystal displays are passive luminous devices, a back light unit is required for the LCD devices to be seen in the dark.

Typically, LCD devices can be divided into several types according to their display methods. For example, a reflective type LCD device saves power and reduces manufacturing costs by reflecting light from the environment for image display. A trasmissive type LCD device comprises an LCD panel and an additional backlight unit for providing a light source to the LCD panel, leading to higher brightness and less restrictions on use.

FIG. 1 is a schematic diagram of a conventional transmissive LCD device 100. As shown in FIG. 1, the LCD device 100 comprises a display panel 120 mounted on a back light unit 110. The back light unit 110 provides a light source for the display panel 120. The display panel 120 comprises a bottom substrate 130, a top substrate 150, and a liquid crystal layer 170 interposed therebetween. The bottom substrate 130 and the top substrate 150 are both transparent substrates, such as glass substrates. Note that FIG. 1 is a simplified cross-sectional diagram from which some elements on the bottom substrate 130 and the top substrate 150 have been omitted for clarity.

Referring to FIG. 2 and FIG. 3, FIG. 2 shows a schematic diagram of a pixel 122 of the display panel 120 adjacent to a side of the bottom substrate 130 and FIG. 3 shows a cross-sectional diagram along a line A-A' in FIG. 2. As shown in FIG. 2 and FIG. 3, the bottom substrate 130 is defined with an array region 130A and a display region 130B. As shown in FIG. 3, the display panel 120 comprises a buffer layer 132 disposed on the bottom substrate 130. A silicon layer 134 is formed on the buffer layer 132. The silicon layer 134 is then patterned and only a portion of the silicon layer 134 in the array region 130A is left to serve as an active area having a source 136, a drain 138, and a channel region 137 between the source 136 and the drain 138. The portion of the silicon layer 134 in the display region 130B is completely removed to increase the brightness of the display panel 120 as the silicon layer 134 has a high reflection rate.

Thereafter, at least one gate insulator 142 is formed on the silicon layer 134 and the buffer layer 132. A gate electrode 144 composed of a conductive material is disposed on the gate insulator 142 directly above the channel region 137. The gate 144, the source 136, and the drain 138 form a transistor 140. A dielectric layer 146 is disposed on the gate electrode 144 and the gate insulator 142. A planarization layer 148 is formed on the dielectric layer 146. As previously mentioned, only one pixel is shown in FIG. 2 and FIG. 3 for clarity while the display panel 120 comprises a plurality of pixels arranged in a matrix.

Regarding the top substrate 150, multiple layers comprising a color filter layer, a top electrode and an alignment layer are formed on a bottom side of the top substrate 150. Since the operating mechanism of the display device 100 is known to those skilled in the art, it is not described in detail here.

Although the display panel 120 is a transmissive display panel, light entering the display panel 120 from the external environment is still partially reflected. For example, light is often reflected by the transparent substrates 130 and 150, the dielectric layer 146 disposed on the surface of the bottom substrate 130, and the layers attached to the top substrate 150, such as the color filter layer. After the light beams are reflected, interference from the reflected light beams occurs, leading to a plurality of dark regions and bright regions arranged in a ring type stripe with noticeable differences in brightness, a phenomenon known as a Newton ring phenomenon. This phenomenon seriously deteriorates the display performance of the display panel 120. Thus, a new display panel structure is desirable to solve the aforementioned problem.

SUMMARY

In accordance with the invention, a display panel structure with an anti-Newton ring structure is provided. The display panel includes a substrate comprising an array region and a display region defined thereon. A buffer layer is disposed on the substrate and at least one transistor is formed in the array region. The display panel further includes an anti-Newton ring structure comprising a silicon layer on the buffer layer in the display region, at least one dielectric layer disposed on the anti-Newton ring structure, and a pixel electrode disposed on the dielectric layer in the display region.

According to various embodiments, there is a display panel comprising a substrate with an array region and a display region defined thereon, a buffer layer disposed on the substrate, and a patterned layer comprising a first area located in the array region serving as an active area comprising a source and a drain, and a second area located in the display region. The display panel also includes at least one gate insulator disposed on the patterned layer and the buffer layer and a gate electrode disposed on the gate insulator above the first area of the pattern layer. Further, there is a planarization layer disposed on the gate electrode and the gate insulator.

According to various embodiments, there is a display panel comprising a substrate defined with an array region and a display region, a buffer layer disposed on the substrate, and at least one transistor in the array region. The display panel also includes a patterned layer on the buffer layer in the display region and at least one dielectric layer disposed on the patterned semiconductor layer These and other advantages of the invention will be apparent to those of ordinary skill in the art after reading the following detailed description with reference to the figures.

Additional advantages of the invention will be set forth in part in the description which follows, and in part will be obvious from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE DRAWINGS

The invention can be more fully understood by reading the subsequent detailed description and examples with references made to the accompanying drawings, wherein.

DETAILED DESCRIPTION

Reference will now be made in detail to the present exemplary embodiments of this invention, examples of which are illustrated in the accompanying drawings. Wherever possible, the same reference numbers will be used throughout the drawings to refer to the same or like parts.

According to various embodiments, anti-Newton ring structures are provided. As will be described in detail here, some embodiments of the anti-Newton ring structures are disposed in a bottom substrate of a display panel. Descriptions of other parts of the display panel are omitted as they are known to those skilled in the art and not directly related.

Figure 1:
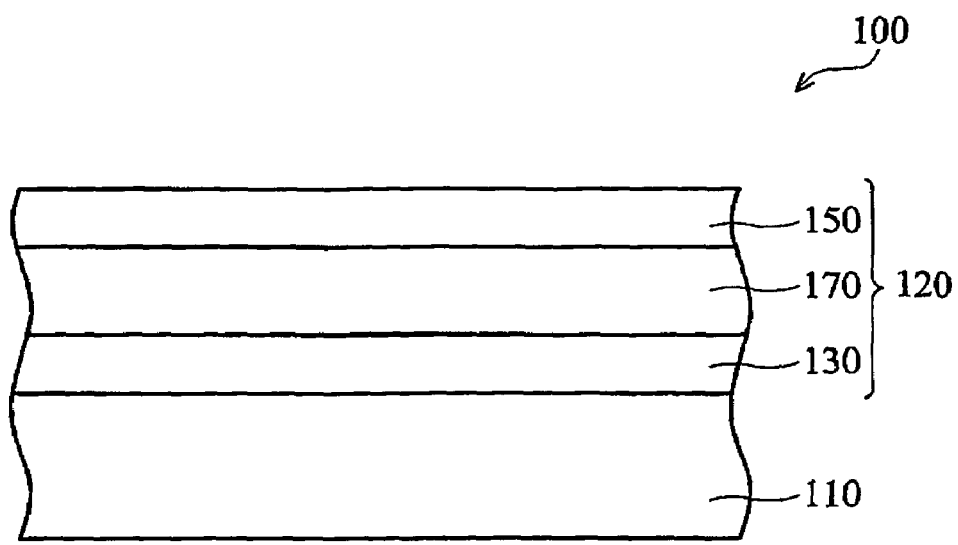
FIG. 1 depicts a cross-sectional schematic diagram of a conventional transmissive LCD device.
Figure 2:
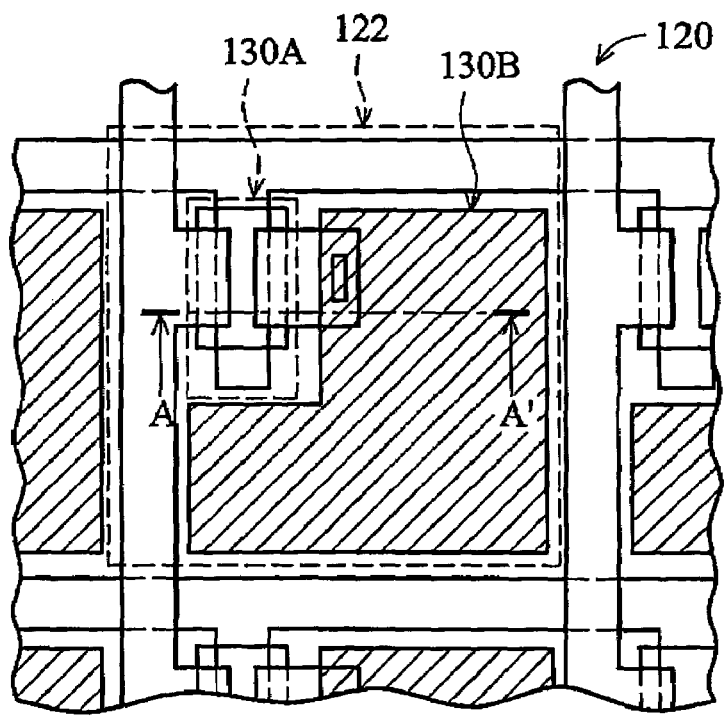
FIG. 2 depicts a top-down schematic diagram of a pixel in the display panel of FIG. 1 adjacent to a side of the bottom substrate.
Figure 3:
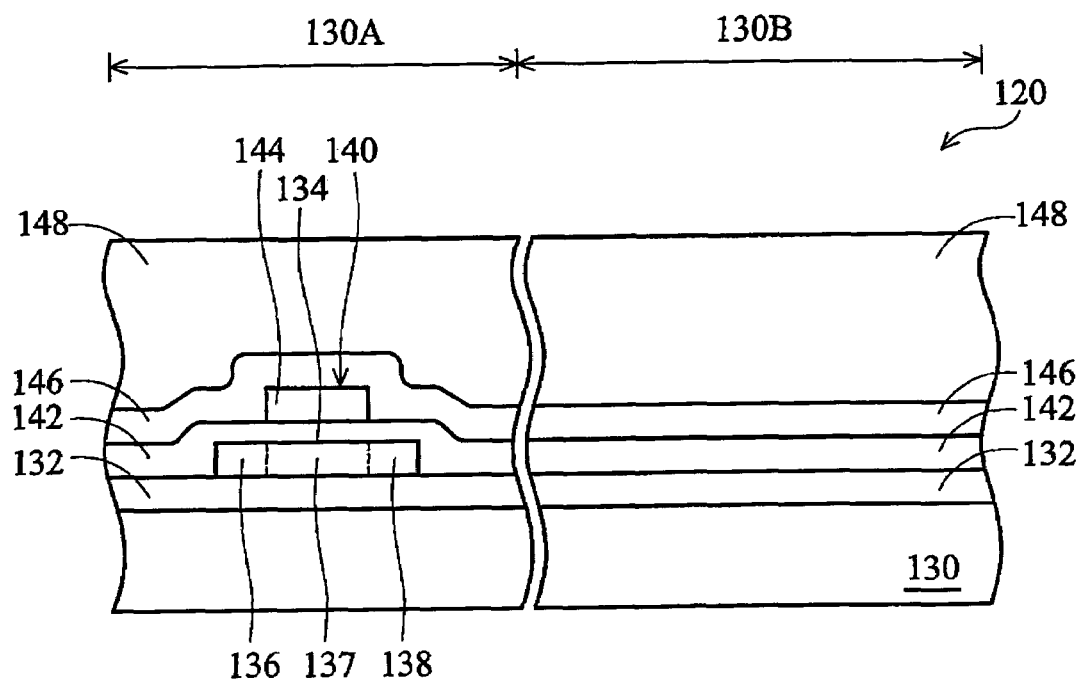
FIG. 3 depicts a cross-sectional diagram along a line A-A' shown in FIG. 2.
Figure 4:
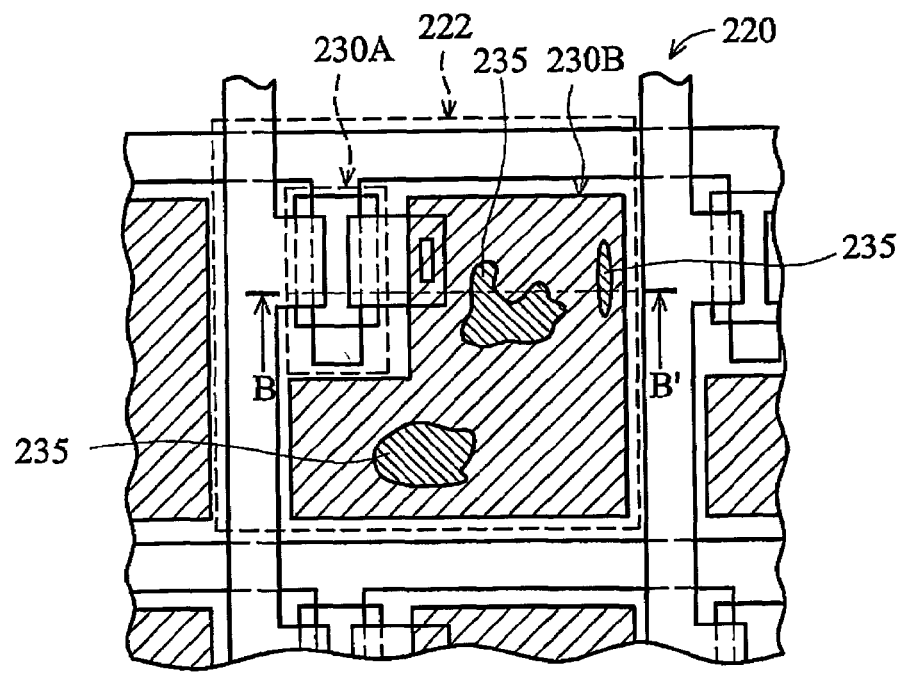
FIG. 4 depicts a top-down schematic diagram of a pixel in an embodiment of a display panel adjacent to a side of the bottom substrate.
Figure 5:
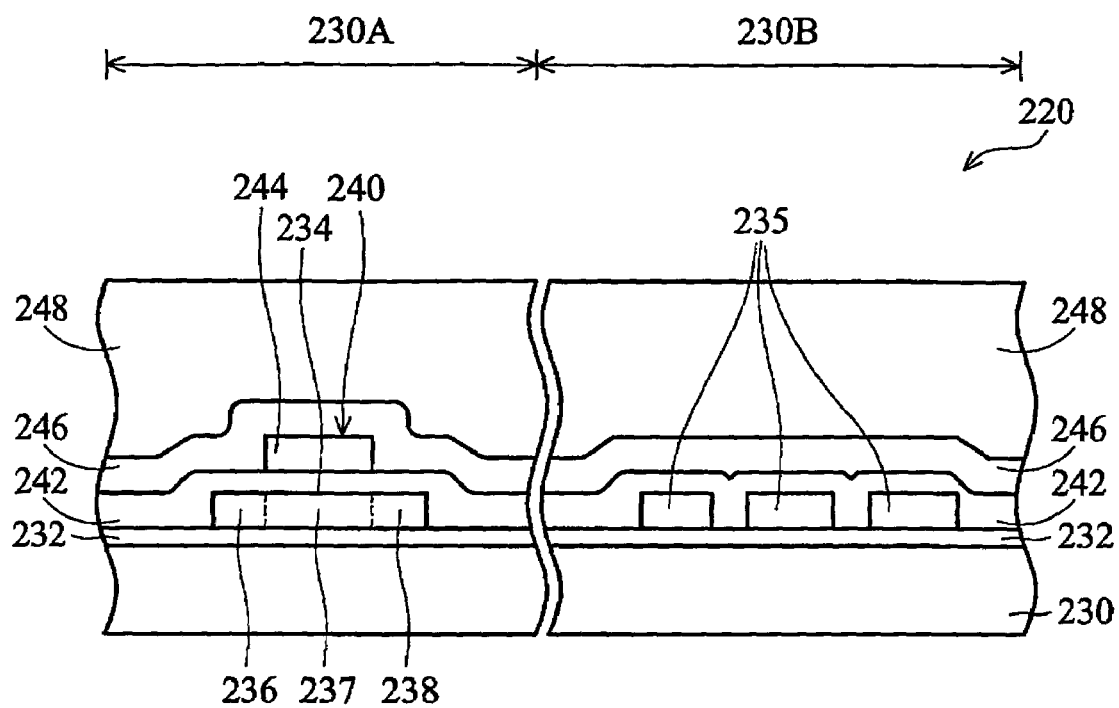
FIG. 5 depicts a cross-sectional diagram along a line B-B' shown in FIG. 4.

FIG. 4 depicts a top-down schematic diagram of a pixel 222 in a display panel 220 adjacent to a side of a bottom substrate, which is shown in FIG. 5 with label 230. FIG. 5 depicts a cross-sectional diagram along a line B-B' in FIG. 4. The bottom substrate 230 is defined with an array region 230A and a display region 230B. Typically, the area of the display region 230B is over 10% of that of the pixel. The display panel 220 also comprises a buffer layer 232 disposed on the bottom substrate 230. A layer is formed on the buffer layer 232. In various embodiments, the layer is a semiconductor layer. Further, in some embodiments, the layer is a silicon layer, such as an amorphous silicon layer or a polysilicon layer. The layer can be patterned by a photolithography and etching process. The patterned layer comprises a first area 234 in the array region 230A and a second area 235 in the display region 230B. According to various embodiments, there can be a plurality of second areas. The first area 234 of the patterned layer serves as an active area comprising a source 236, a drain 238, and a channel region 237 between the source 236 and the drain 238. The second area 235 of the patterned layer in the display region 230B serves as an anti-Newton ring structure to reduce Newton ring phenomenon.

According to various embodiments the second area 235 can be formed separately from the first area 234. Moreover, the second area 235 can comprise materials other than silicon. For example, the material of the second area 235 can comprise GaAs or other compound semiconductor materials. Alternatively, the second area 235 can comprise other materials, such as dielectrics, such as silicon oxide, silicon nitride, and silicon oxynitrides. The second area 235 can also comprise conductive materials At least one gate insulator 242 is formed on the patterned layer and the buffer layer 232. In some embodiments of the present invention, the gate insulator 242 comprises a silicon oxide layer or a silicon nitride layer. According to various embodiments, the gate insulator 242 can comprise a stack of materials, such as a silicon oxide layer and a silicon nitride layer. A gate electrode 244 comprising a conductive material is disposed on the gate insulator 242 directly above the channel region 237. The gate 244, the source 236, and the drain 238 form a transistor 240. A dielectric layer 246 is disposed on the gate electrode 244 and the gate insulator 242 and a planarization layer 248 is then formed on the dielectric layer 246. As previously mentioned, only one pixel 222 is shown in FIG. 4 and FIG. 5 for clarity while the display panel 220 can comprise a plurality of pixels 222 arranged for example, in a matrix.

Figure 6:
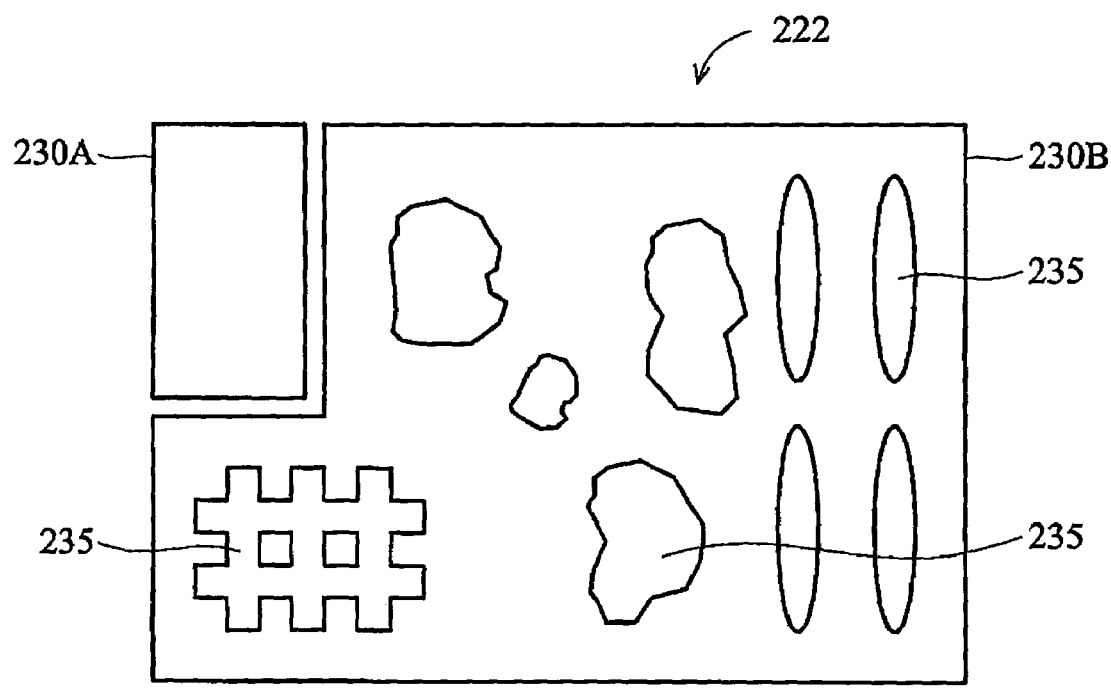
FIG. 6 depicts a top-down view of a pixel in an embodiment of a display panel.

According to various embodiments, a layout of the second area 235 of the patterned layer can be modified according to product requirements. As shown in FIG. 6, which is top view of an embodiment of a pixel, the second area 235 of the patterned layer in the display region 230B can comprise a grid pattern, a plurality of islands with similar or random shapes, a plurality of bands, or a combination thereof.

Figure 7:
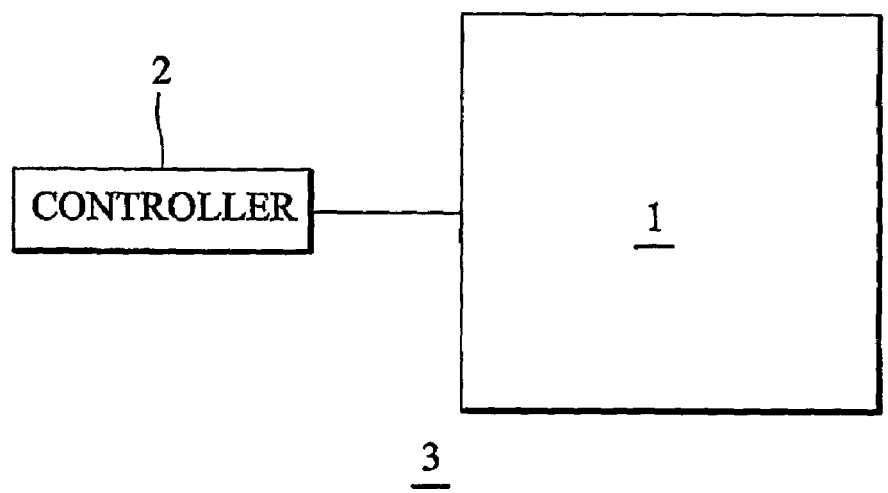
FIG. 7 depicts a block diagram of in an embodiment of an LCD device.

Some embodiments of an LCD device comprise the previously mentioned display panel. FIG. 7 is a block diagram illustrating a LCD device 3 comprising a LCD panel 1, which is the same as the previously mentioned display panel 220. The LCD device 3 further comprises a controller 2 coupled to the display panel 1. The controller 2 can comprise a driving circuit (not shown) to control the display panel 1 to render images in accordance with an input.

Figure 8:
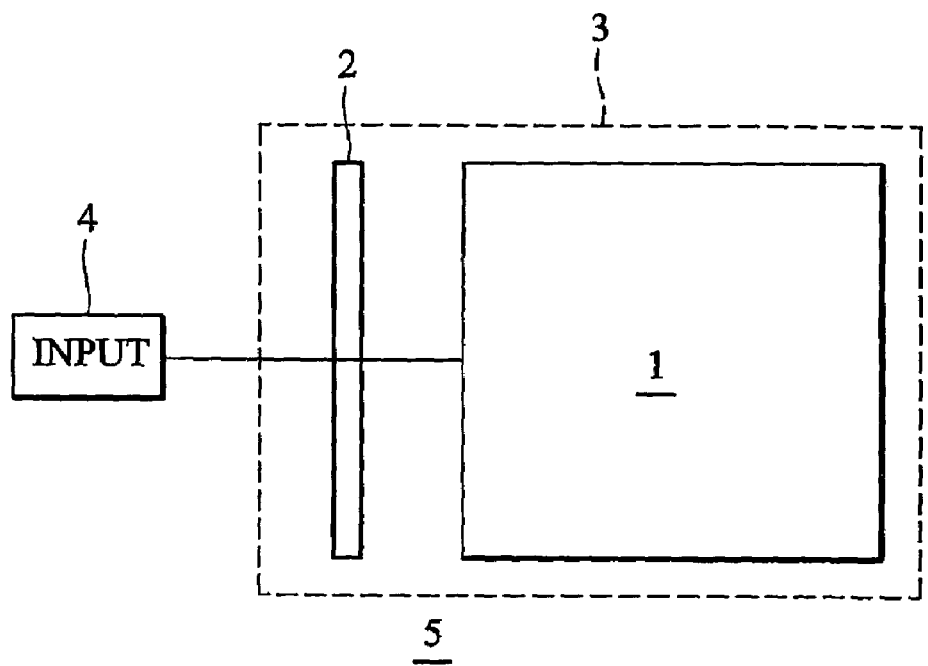
FIG. 8 depicts a block diagram of an embodiment of an electronic device.

FIG. 8 is a block diagram illustrating an electronic device incorporating the LCD device 3 shown in FIG. 7. An input device 4 is coupled to the controller 2 of the LCD device 3 shown in FIG. 7 to form an electronic device 5. The input device 4 can include a processor or the like to input data to the controller 2 to render images. The electronic device 5 may be a portable device such as a PDA, notebook computer, tablet computer, cellular phone, or a display monitor device, or non-portable device such as a desktop computer.

According to the present invention, the second areas 235 of the patterned layer are formed in the display region 230B. As previously mentioned, the Newton ring phenomenon is caused by the light beams reflected by a plurality of layers in a display panel. According to various embodiments, the light beams reflected by the second areas 235 of the patterned layer will interfere with other reflected light beams due to optical path differences. A contrast between bright regions and dark regions in the Newton ring is thereby reduced. In other words, the Newton ring phenomenon can be improved effectively.

While the invention has been described by way of example and in terms of preferred embodiment, it is to be understood that the invention is not limited thereto.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A pixel of a display panel comprising:
   a substrate with an array region and a transmissive display region defined thereon;

a buffer layer disposed on the substrate;

a patterned layer comprising a first area located in the array region serving as an active area comprising a source and a drain, and a second area located in the transmissive display region serving as an anti-Newton ring structure to reduce Newton ring phenomenon;

at least one gate insulator disposed on the patterned layer and the buffer layer;

a gate electrode disposed on the gate insulator above the first area of the pattern layer; and a planarization layer disposed on the gate electrode and the gate insulator.

2. The pixel of the display panel as claimed in claim 1, wherein the patterned layer comprises a semiconductor material.

3. The pixel of the display panel as claimed in claim 1 wherein the patterned layer comprises at least one of an amorphous silicon layer and a polysilicon layer.

4. The pixel of the display panel as claimed in claim 1 wherein the second area of the patterned layer comprises a grid pattern.

5. The pixel of the display panel as claimed in claim 1 wherein the second area of the patterned layer comprises at least one of a plurality of bands and islands.

6. The pixel of the display panel as claimed in claim 1 wherein the area of the display region is more than 10% of that of the pixel.

7. The pixel of the display panel as claimed in claim 1 wherein the display panel is a liquid crystal display panel.

8. The pixel of the display panel as claimed in claim 1 wherein the display panel is a transmissive display panel and the substrate is a transparent substrate.

9. The pixel of the display panel as claimed in claim 8 wherein the substrate comprises a glass substrate.

10. A display panel having the plurality of pixels as claimed in claim 1 comprising:

at least one transistor in the array region;

the patterned layer on the buffer layer in the transmissive display region; and at least one dielectric layer disposed on the patterned layer.

11. The display panel as claimed in claim 10, wherein the patterned layer comprises a semiconductor material.

12. The display panel as claimed in claim 10 wherein the patterned layer comprises at least one of an amorphous silicon layer and a polysilicon layer.

13. The display panel as claimed in claim 10 wherein the patterned layer comprises a silicon layer comprising a grid pattern.

14. The display panel as claimed in claim 10 wherein the patterned layer comprises a silicon layer with at least one of a plurality of bands and islands.

15. The display panel as claimed in claim 10 wherein the display panel is a liquid crystal display panel.

16. The display panel as claimed in claim 10 wherein the display panel is a transmissive display panel and the substrate is a transparent substrate.

17. The display panel as claimed in claim 10, wherein the patterned layer comprises an anti-Newton ring structure.

18. An electronic device, comprising:

a display device, comprising:

the display panel as claimed in claim 10; and a controller coupled to the display panel to render an image in accordance with an input; and an input device coupled to the controller of the display device to control the display device to render an image.

\* \* \* \* \*

UNITED STATES PATENT AND TRADEMARK OFFICE
CERTIFICATE OF CORRECTION

PATENT NO.         : 7,342,253 B2                                          Page 1 of 1
APPLICATION NO.    : 10/992008
DATED              : March 11, 2008
INVENTOR(S)        : Sun et al.

It is certified that error appears in the above-identified patent and that said Letters Patent is hereby corrected as shown below:

On the Title Page the Assignee should be as shown:

Item (73) TPO ~~Display~~ <u>Displays</u> Corp., Miao-Li County

Signed and Sealed this

Tenth Day of June, 2008

JON W. DUDAS
*Director of the United States Patent and Trademark Office*